US010988849B2

(12) United States Patent
Langley (10) Patent No.: US 10,988,849 B2
(45) Date of Patent: Apr. 27, 2021

(54) ELECTROCHEMICAL DEVICE FOR CASCADING REACTIVE DISTILLATION

(71) Applicant: Justin Langley, Fargo, ND (US)

(72) Inventor: Justin Langley, Fargo, ND (US)

(73) Assignee: Blue Skies Research, Inc., Fargo, ND (US)

( * ) Notice: Subject to any disclaimer, the term of this patent is extended or adjusted under 35 U.S.C. 154(b) by 0 days.

(21) Appl. No.: 16/622,129

(22) PCT Filed: Jun. 15, 2018

(86) PCT No.: PCT/US2018/037931
§ 371 (c)(1),
(2) Date: Dec. 12, 2019

(87) PCT Pub. No.: WO2019/005510
PCT Pub. Date: Jan. 3, 2019

(65) Prior Publication Data
US 2020/0385874 A1    Dec. 10, 2020

Related U.S. Application Data

(60) Provisional application No. 62/526,873, filed on Jun. 29, 2017.

(51) Int. Cl.
*C25B 15/08*    (2006.01)
*C25B 11/036*    (2021.01)
(Continued)

(52) U.S. Cl.
CPC .......... *C25B 11/036* (2021.01); *B09B 3/0083* (2013.01); *C01B 3/348* (2013.01);
(Continued)

(58) Field of Classification Search
CPC .......... C25B 15/08; C25B 15/02; C25B 9/00; C25B 11/12; C25B 11/00; C25B 1/26
See application file for complete search history.

(56) References Cited

U.S. PATENT DOCUMENTS 3,616,438 A    10/1971    Foley et al.
4,151,061 A    4/1979    Ishikawa et al.
(Continued)

FOREIGN PATENT DOCUMENTS

CA    1124210 A    5/1982

OTHER PUBLICATIONS

International preliminary report on patentability for PCT/US2018/037931, dated Mar. 18, 2020, 3 pages.
(Continued)

*Primary Examiner* — Zulmariam Mendez
(74) *Attorney, Agent, or Firm* — Danielson Legal LLC (57) ABSTRACT

The following describes a reconfigurable set of industrial processing techniques which, when appropriately combined, enable zero-emissions reforming, utilizing a wide range of conventional and unconventional feedstocks. Hydrocarbons, harvested or refuse biomass, as well as assorted byproducts and wastes are reformed through tightly integrated processing. The system is designed to incorporate alternative energy sources such as renewables or nuclear for high-density energy utilization and storage. Central to the processing
(Continued)

methodology is a novel molten salt electrochemical reactor designed as a modular system for high-throughput carbo-chlorination and resource recovery. Such a configuration drastically reduces or eliminates waste while improving efficiency and realizing vast new economic incentives.

21 Claims, 5 Drawing Sheets

(51) Int. Cl.
| | | |
|---|---|---|
| B09B 3/00 | (2006.01) | |
| C01B 3/34 | (2006.01) | |
| C25B 1/26 | (2006.01) | |
| C25B 11/02 | (2021.01) | |
| C25C 3/34 | (2006.01) | |
| C25C 7/00 | (2006.01) | |
| C25C 7/02 | (2006.01) | |
| C25B 11/043 | (2021.01) | |
| C25B 11/061 | (2021.01) | |

(52) U.S. Cl.
CPC .............. *C25B 1/26* (2013.01); *C25B 11/02* (2013.01); *C25B 11/043* (2021.01); *C25B 11/061* (2021.01); *C25C 3/34* (2013.01); *C25C 7/005* (2013.01); *C25C 7/025* (2013.01); *C01B 2203/0216* (2013.01); *C01B 2203/062* (2013.01)

(56) References Cited

U.S. PATENT DOCUMENTS

| | | |
|---|---|---|
| 4,338,177 A | 7/1982 | Withers et al. |
| 4,440,610 A | 4/1984 | Dawless et al. |
| 2006/0199125 A1 | 9/2006 | Evans |
| 2015/0225864 A1 | 8/2015 | Gesing et al. |
| 2016/0215407 A1 | 7/2016 | Iosaki |

OTHER PUBLICATIONS

International search report for PCT/US2018/037931, dated Sep. 10, 2018, 3 pages.
Nritten opinion from the ISA for PCT/US2018/037931, dated Sep. 10, 2018, 7 pages.
Mehnazd; "Top 26 Innovated Uses of Shipping Containers"; <<https://web.arcive.org/web/20160101165014/https://www.marineinsight.com/recreation/top-26-innovative-uses-of-shipping-containers/>> Jan. 1, 2016.
Office Action from the Canadian Patent Office for Can. Appl. No. 3,064,627, dated Sep. 3, 2020, 3 pages.
Examination Search Report from the Canadian Patent Office for Can. Appl. No. 3,064,627, dated Sep. 2, 2020, 1 page.

Figure 2 - "X to Liquids" Integration

Figure 3 - Power Integration

ELECTROCHEMICAL DEVICE FOR CASCADING REACTIVE DISTILLATION

CROSS REFERENCE TO RELATED APPLICATIONS

The present application is a national phase application of International (PCT) Patent Appl. No. PCT/US2018/037931, filed internationally on Jun. 15, 2018, and claims the benefit of and priority to U. S. Provisional Appl. No. 62/526,873, filed on Jun. 29, 2017, the entire disclosure of each of which is incorporated by reference as if set forth in their entirety herein.

TECHNICAL FIELD

Embodiments of the present invention relate to a reconfigurable process and apparatus for integrating waste conversion and material recovery within major industrial sectors such as electricity production, resource extraction, and waste management. More specifically, plasma reactors and molten salt electrochemical cells are utilized for high-throughput reactive distillation and chemical vapor transport of mixed solids via carbochlorination.

BACKGROUND

Rapid growth and modernization are the hallmarks of a healthy and vibrant economy and are understandably sought-after goals of nearly every nation on the planet. The advances in technologies developed throughout the industrial revolution and beyond have allowed growth by developing countries at rates and scales never previously seen. These are widely accepted as positive advances ideally capable of spreading to all peoples and bringing a better quality of life to everyone on the planet. However, the shortcomings of common methods and modes of resource extraction and utilization present in modern industry are becoming increasingly problematic. Conservative estimates put the total amount of waste generated globally at over 10 billion tons per year, with that number expected to double over the next 10 years. From an ecological, industrial, or any realistic viewpoint, this is not a sustainable model.

Negative effects of anthropogenic metabolism are a multi-pronged and increasingly apparent issue in both industrialized and developing nations around the world. It is becoming more widely accepted that current industrial processes cannot scale to the point of being accessible to more than a fraction of the world's population without exacting enormous tolls in terms of environmental degradation and resource availability, offsetting or even counteracting the sought-after gains promised by modern technologies. Rapidly developing countries provide an excellent case-study in how modern industrial technologies can be leveraged to raise the standard of living in previously unimaginably short periods of time. These technologies, however, are not without their drawbacks. Air pollution and smog alerts in China's major population centers are one example, among many, of the consequences of scaling legacy processes along with their associated pollution and waste management challenges. Although alternatives have been developed, many major industrial processes have not evolved significantly beyond their initial implementation. This creates an increasing environmental footprint and gives little thought to industrial ecology. For truly sustainable and environmentally sound processes, industrial symbiosis becomes essential. Further compounding the challenge, significant economic advantage is a prerequisite in displacing well-known processing techniques in what is generally a very capital intensive and risk-averse industry.

SUMMARY

Embodiments of the present invention utilize waste by way of proven industrial methods for highly selective electrochemical processing and molten salt gasification with high atom efficiency via carbochlorination looping. Various analyses of gasification processes have shown that a variety of feedstocks from coal, shale, bitumen, biomass, and even garbage can be used to produce synthetic crude and liquid fuels. However, most of these techniques produce significant amounts of carbon dioxide due to their reliance on direct oxidation. Mitigating carbon dioxide production through carbon capture and storage tends to rely on either cryogenic separation or electrolysis to produce pure oxygen, both methods having associated capital costs and energy penalties. The proposed process integration alleviates these disadvantages by eliminating much of the ancillary equipment typically used in gasification such as air separation and gas cleanup, these features instead being directly integrated with the syngas production. Further economic gains are realized through expanding available feedstocks to include various industrial and municipal wastes as well as the advantageous recovery and reuse of inorganic residue fractions. Through the chlorination of gasification residues, a three-pronged, flexible method of reducing carbon emission is realized. Principally, minimal oxygen is introduced to the process; furthermore, produced or delivered carbon dioxide may be utilized in the synthesis gas processing; and finally, a portion of the formed metal chlorides may be utilized for capturing carbon dioxide long-term as carbonate minerals.

Embodiments of the invention utilize processes having inherent carbon capture and conversion capabilities. Design goals are to maximize flexibility, efficiency, and economics while enabling environmentally and sustainably sound practices. A hybrid thermochemical cycle integrates pyrolysis, staged reforming and residue chlorination. Hydrogen generated is used to upgrade practically any carbon feedstock including bitumen, shale, coal, and biomass. The residues of the upgrading are chlorinated, metals of interest are recovered, and the remainder can be reacted to form carbonate minerals and construction materials. This combination provides a highly efficient method of producing any range of hydrocarbons, as well as various valuable metals and materials. The processing compliments some of the best available electricity generation technologies such as Integrated Gasification Combined Cycle (IGCC) or Integrated Gasification Fuel Cell (IGFC) power plants, while enhancing efficiency and economics by incorporating the recovery of strategic resources and useful construction materials. Synthesis gas produced can be cleanly burned on-site and most carbonaceous materials, when utilized in the process, will produce excess power which may be sold to the grid. Furthermore, renewable energy sources such as solar and wind or nuclear power can be easily integrated for carbon neutral or negative processing (i.e. carbon dioxide recycling) via liquid hydrocarbon synthesis. Feedstocks, including waste of literally any form, are neutralized and converted to valuable commodities and/or construction materials.

Beyond the numerous economic and environmental benefits of recovering both energy and metals from what are generally regarded as waste streams, embodiments of the invention also directly address one of the major issues with adding renewable energy sources to the power grid. The challenge presented by solar, wind, and distributed generation in general is that they are, by their very nature, variable sources requiring energy storage for effective integration. Electricity producers currently require idle generation capacity capable of meeting roughly twice the average electrical demand. This idle capacity is used in meeting peak conditions and reserve margins; adding highly variable distributed generation only compounds the challenge. A utility scale implementation of the present invention exploits idle generator capacity as spinning reserve in the production of synthetic hydrocarbons. Molten salts, aside from catalyzing reactions, have proven useful as both thermal and electrochemical storage solutions.

Thus, embodiments of the present invention present a highly adaptable platform for meeting the challenge of grid scale energy storage. This disclosure also details the technology's use in power plant retrofits, renewable energy integration, CO2 recycling, and load following through thermal and chemical energy storage.

Through largely cyclical processing, a pathway for green chemistry and carbon dioxide emission reductions across a multitude of industrial processes becomes feasible. The unit integration itself need not follow the proposed layout and can be economically deployed across a broad range of scales, from multi-megawatt power plants to tens of kilowatts for distributed or off-grid applications.

The processing methodology deviates from traditional gasification processes in numerous aspects. First and foremost, reforming is paired with pyrometallurgical techniques, taking advantage of synergies unrealized by independent processing infrastructures. Carbo-chlorination of inorganic ash, formed by pyrolysis and reforming, concentrates trace elements such as precious metals and rare earth elements, by orders of magnitude, enabling their subsequent recovery. The bulk of the inorganic fraction, typically being mostly silica, is converted to gaseous chlorides such as silicon tetrachloride and subsequently reacted with water to form hydrogen chloride gas as well as nano-structured fumed silica. This form of silica, among a wide array of other uses, is beneficial in manufacturing ultra-high-performance cement and concretes. The silica can be removed through simple cyclones or filters and remaining gas and particles are recycled back into the gasification process. Such a process arrangement drastically changes the economics of power plants through the incorporation of tipping fees for waste disposal, cogeneration of liquid hydrocarbons, and recovery of high value metals and materials. Maximum value is realized from coal and various wastes through the recovery of trace elements as part of the energy extraction. Flexibility in carbon sourcing also allows for utilization of advantageous feedstocks from locally available sources. Carbonaceous materials can be selected from the cheapest available hydrocarbons or even waste materials such as electronics waste, which can have precious metal content exceeding a kilogram per tonne (1000 ppm).

A particularly significant aspect of the design utilizes chemical looping which, provided a proper energy source, can reform carbon dioxide through synthesis gas processing. Modular reactors are ideal because they can be installed in banks and added as required for scaling or integrating process add-ons. In practice, virtually any energy source may be incorporated to reduce direct oxidation (via air), which in turn reduces the amount of carbon dioxide either captured or rejected to the environment.

Embodiments of the invention expand gasification technologies to incorporate chlorination. This strategy expands the potential feedstock to virtually any materials that can be beneficially broken down for the recovery of valuable constituent elements. Carbon dioxide still forms through the reduction or carbochlorination of various metals, however portions of these metal chlorides, such as calcium chloride, may subsequently be utilized in capturing carbon dioxide as carbonate minerals. Furthermore, electrolysis may be incorporated to advantageously remove oxygen from multiple processing steps. For instance, a reversible fuel cell stack can be used for peak electricity generation and reversed to produce extra syngas for hydrocarbon production when electricity demand is low.

Further advantages are made apparent when considering the combined functionality of the individual units' operations. Utilization of plasma reactors allows for very compact processing equipment. In turn, this extreme process intensification lends itself to modular design and economies of scale in the production of individual processing units. The three main unit operations presented can scale dramatically depending on the feedstock's content of water, carbon, ash, etc. To compensate for this, in a full-scale operation, the core operations are designed as modules which dynamically adjust their feed and product composition, forming a cascading series with higher capacity operations utilizing multiple parallel units. This scaling compounds the advantage of high processing intensity and can be expanded upon through multiple redundant processing trains.

Utilizing the present invention's core processing, an assortment of traditional metallurgy and hydrocarbon processing unit operations can be integrated. This disclosure focuses on advanced technologies that compliment an all-of-the-above energy strategy. Renewable and nuclear energy sources can be used to power liquid hydrocarbon synthesis, storing energy in a practical and familiar medium with a vast infrastructure already in place for its transportation and beneficial use. Pyrolysis and gasification of biomass along with more typical feedstock is a proven and scalable method of producing carbon-neutral biofuels and petrochemicals. Metallurgical processing byproducts can provide useful heat and materials to the core molten salt reactors. Recovery of precious metals and rare-earths are of significant interest and related processing could be tightly integrated. For instance, lead bullion may be processed to recover gold, silver, and PGMs, while the produced dross is reprocessed for heat and material recovery. Higher temperature operations such as iron and steel production can also be integrated as a high-quality heat source, recovering useful heat from the off-gas and slag produced. Access to appropriate heat (500 C+) is required for high reforming throughput. This heat is produced via the core electrochemical and plasma reactions and distributed to subsystems that require heat for reaction (endothermic). The ideal power source for enabling full functionality would be an Advanced High Temperature Nuclear Reactor. In addition to providing baseload electricity, heat could be utilized directly without the inefficiency of first converting it to electricity. Several Generation IV reactors are suitable for this purpose and modular designs allow for scalable operations as well as the potential for integrating carbon dioxide recycling at a future date. Along with storing energy via hydrocarbon synthesis, various thermal and chemical energy storage options are available. The molten salt itself, acting as a thermal reservoir, compensates for variability in feedstock and operating conditions. This could be easily extended by increasing the volume of molten salt or adding dedicated reservoirs for the sole purpose of thermal storage. Various reactive compounds created via carbochlorination can also be utilized as an energy storage medium. Finally, the electrochemical cells forming the core processing share commonalities with molten metal/salt batteries and may have use as such. A plurality of operational modes could be utilized for efficiently converting and storing energy.

BRIEF DESCRIPTION OF DRAWINGS

FIG. 1 illustrates a highly compact implementation of the present invention. Subsystems referenced in the figure are briefly described as follows:
- 1.01 (Stage 1 or S1) Plasma pyrolysis and reforming of incoming solids
- 1.02 (Stage 2 or S2) Electrochemically assisted carbochlorination of oxides
- 1.03 (Stage 3 or S3) Molten salt reforming and synthesis gas cleaning
- 1.04 Plasma reactor (electro-burner) for processing chloride gas
- 1.05 Cyclone separation of produced nano-solids
- 1.06 Chemical vapor transport of rare earth chlorides
- 1.07 Electrolysis of molten salt for metal recovery and chlorine gas production
- 1.08 Processing of lead bullion for high-value metal recovery
- 1.09 Lead bullion including precious metal content
- 1.10 Molten chloride salt product of S2 (1.02)
- 1.11 Produced clean syngas or hydrogen
- 1.12 Off-gas from S1 to S3 (via 1.13)
- 1.13 Off-gas from S1 to S3 (via 1.12)
- 1.14 Off-gas from S2 to S1 (via 1.15)
- 1.15 Off-gas from S2 to S1 (via 1.14)
- 1.16 Produced raw synthesis gas from S1 (1.01)
- 1.17 Produced raw chloride gas from S2 (1.02)
- 1.18 Produced cleaned syngas from S3 (1.03)
- 1.19 Chlorine gas to S2 (1.02)
- 1.20 Partially chlorinated molten salt and ash from S1 (1.01)
- 1.21 Molten salts (OH, CO3) from S3 (1.03)
- 1.22 Sodium salts to S3 (1.03)
- 1.23 Make-up salts to S3 (1.03)
- 1.24 Make-up chlorine to S2 (1.02)
- 1.25 Ore feed
- 1.26 Water feed
- 1.27 Solid carbonaceous feed
- 1.28 Steam and light hydrocarbon gas feed
- 1.29 Electrolytically produced metals (e.g. Magnesium)
- 1.30 Rare earth concentrate
- 1.31 Non-ferrous metal recovery (e.g. PGMs)
- 1.32 Nano-structured solid oxides (e.g. fumed silica)
- 1.33 Bulk solids removal (e.g. calcium sulfate, sulfide, carbonate, etc.)

Subsystems 1.01, 1.02, and 1.03 will henceforth be referred to by their arbitrary stage designations S1, S2, and S3.

FIG. 2 illustrates a hypothetical hybrid "X to liquids" integration. Subsystems referenced in the figure are briefly described as follows:
- 2.01 Molten salt trapping of entrained carbon
- 2.02 Volatilization of carbonaceous feedstock
- 2.03 Distillation of raw hydrocarbon gas stream (bulk or fractional)
- 2.04 Fischer-Tropsch (FT) reactor
- 2.05 Heat exchanger (HX) integrated with FT reactor (2.04)
- 2.06 Electric motor/generator mechanically connected to 2.07 and 2.08
- 2.07 Hydrocarbon gas compressor
- 2.08 Hydrocarbon gas expander
- 2.09 Off-gas from S1 (equivalent to 1.16)
- 2.10 Molten salt and entrained carbon to S1
- 2.11 Molten salt from S3
- 2.12 Molten salt and carbon to S3
- 2.13 Near-coke to S1
- 2.14 Light hydrocarbon gas to compression (2.07)
- 2.15 Synthesis gas from power island (equivalent to 3.14)
- 2.16 Light hydrocarbon gas to S3 (equivalent to 1.12)
- 2.17 Condensed water to FT-HX (2.05)
- 2.18 Cooling water input
- 2.19 Carbon dioxide input (pressurized) to FT-HX (2.05)
- 2.20 Natural gas input (pressurized) to FT-HX (2.05)
- 2.21 Syncrude product output
- 2.22 Raw hydrocarbon gas
- 2.23 Synthesis gas FIG. 3 illustrates a hypothetical high-efficiency power cycle with carbon capture. Subsystems referenced in the figure are briefly described as follows:
- 3.01 Molten carbonate electrodialysis stack
- 3.02 Solid oxide fuel cell stack
- 3.03 Working fluid recuperator (heat exchanger)
- 3.04 Water condenser (heat exchanger)
- 3.05 Cooler for product carbon dioxide stream (heat exchanger)
- 3.06 Molten salt heat transfer (heat exchanger) from S3
- 3.07 Liquid chemical looping combustion integrated with S3
- 3.08 Air recuperator (heat exchanger)
- 3.09 Electric motor/generator mechanically connected to 3.10-3.12
- 3.10 Working fluid expander
- 3.11 Working fluid compressor
- 3.12 Fuel gas compressor
- 3.13 Syngas from S3 (equivalent to 1.11)
- 3.14 Syngas (hydrogen-rich) to FT (2.04)
- 3.15 Syngas (oxygen-rich) fuel
- 3.16 Ambient air
- 3.17 Working fluid (super-critical carbon dioxide)
- 3.18 Pressurized carbon dioxide product
- 3.19 Condensed water product FIG. 4 illustrates a simplified cross-sectional view of several possible embodiments of an electrochemically assisted molten salt carbochlorination apparatus. Arrangements depicted in the illustration are as follows:
- 4.1 A solid carbon electrode in direct contact with the molten salt.
- 4.2 A hollow solid carbon electrode wherein feedstock is injected directly into and forced to pass through the plasma created via electric arcing.
- 4.3 A solid carbon electrode located coaxially within a non-conducting electrode sheath.
- 4.4 Molten-metal electrode
- 4.5 Solid carbon electrode
- 4.6 Fused (molten) salt electrolyte
- 4.7 Electrode channel
- 4.8 Reactor headspace FIG. 5 illustrates one possible embodiment of the electrochemical reactor assemblies.
- 5.01 Molten-metal electrode
- 5.02 Fused salt electrolyte of internal reactor
- 5.03 Fused salt (containment salt) of external enclosure
- 5.04 Electrode assembly
- 5.05 Reactor headspace
- 5.06 External enclosure
- 5.07 Internal reactor (cell) containment wall
- 5.08 Cross-sectional view of the narrow end of the device
- 5.09 Cross-sectional view of the device from the top down
- 5.10 Cross-sectional view of the broad side of the device

DETAILED DESCRIPTION

Figure 1:
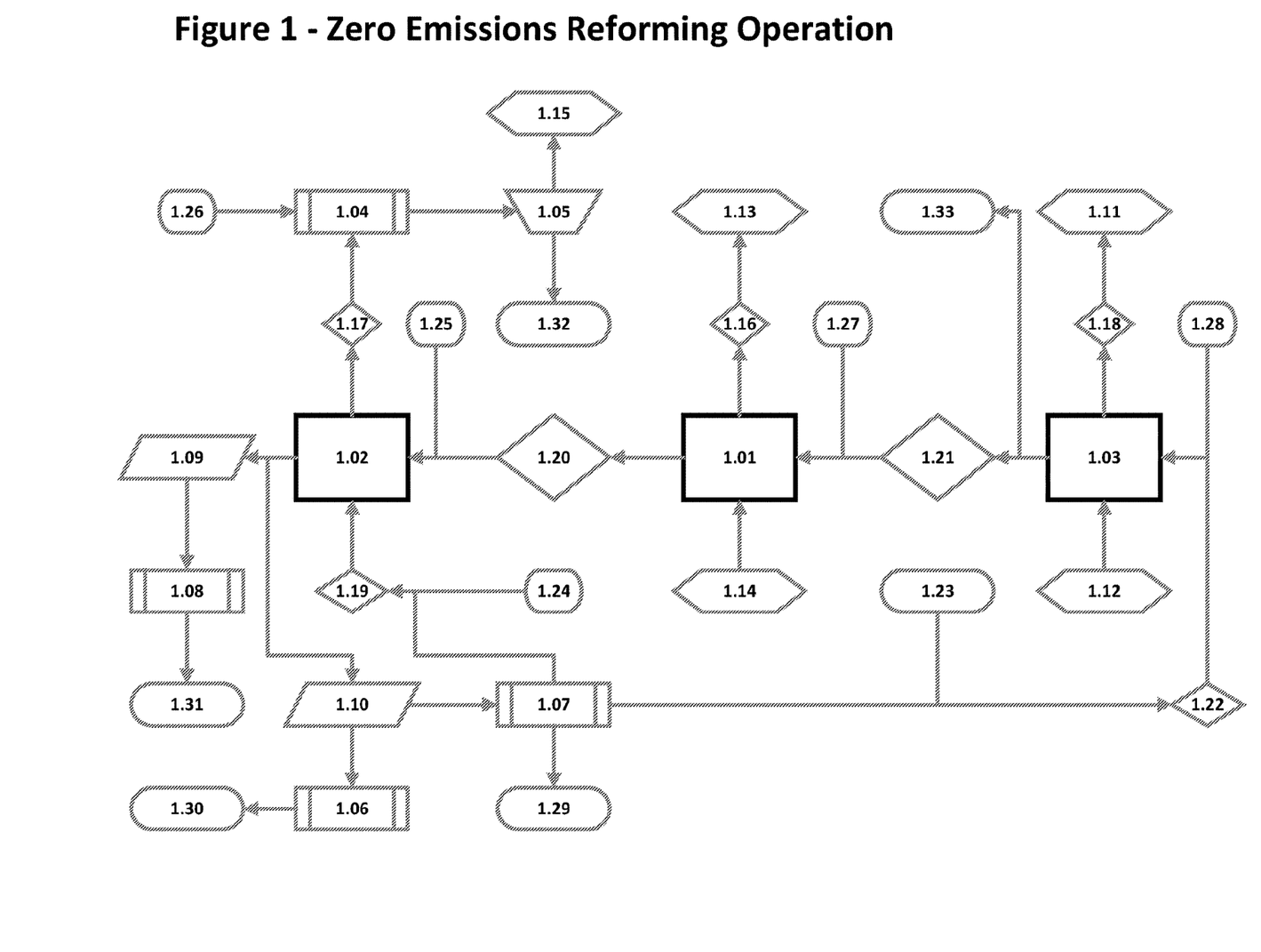

With reference to FIG. 1, the three reaction stages are Stage 1 (S1)—Plasma Pyrolysis/Plasma Reforming (1.01), Stage 2 (S2)—Submerged Arc Molten Salt Chlorination (1.02), and Stage 3 (S3)—Molten Salt Reforming (1.03). There are two distinct material flows, which are contacted within the reactors for various energy and material exchanges: gaseous products (1.16, 1.17, 1.18) flow countercurrent to the solid/liquid product (1.09, 1.10, 1.20, 1.21). An explanation of each core process and various sub-processes, with alternative arrangements, and chemistry involved will highlight the benefits of this process engineering as well as the chemistries employed in the tight coupling of the reactors. One feature of the design emerges from the countercurrent flows, as well as various feedback loops. This looping, coupled with variable feedstocks (1.23, 1.24, 1.25, 1.26, 1.27, 1.28) introduces a level of hysteresis not commonly found in continuous industrial processing. Flexibility of the individual reaction stages operating as a complex adaptive system compensates for this, as will become apparent in the following description.

Figure 2:
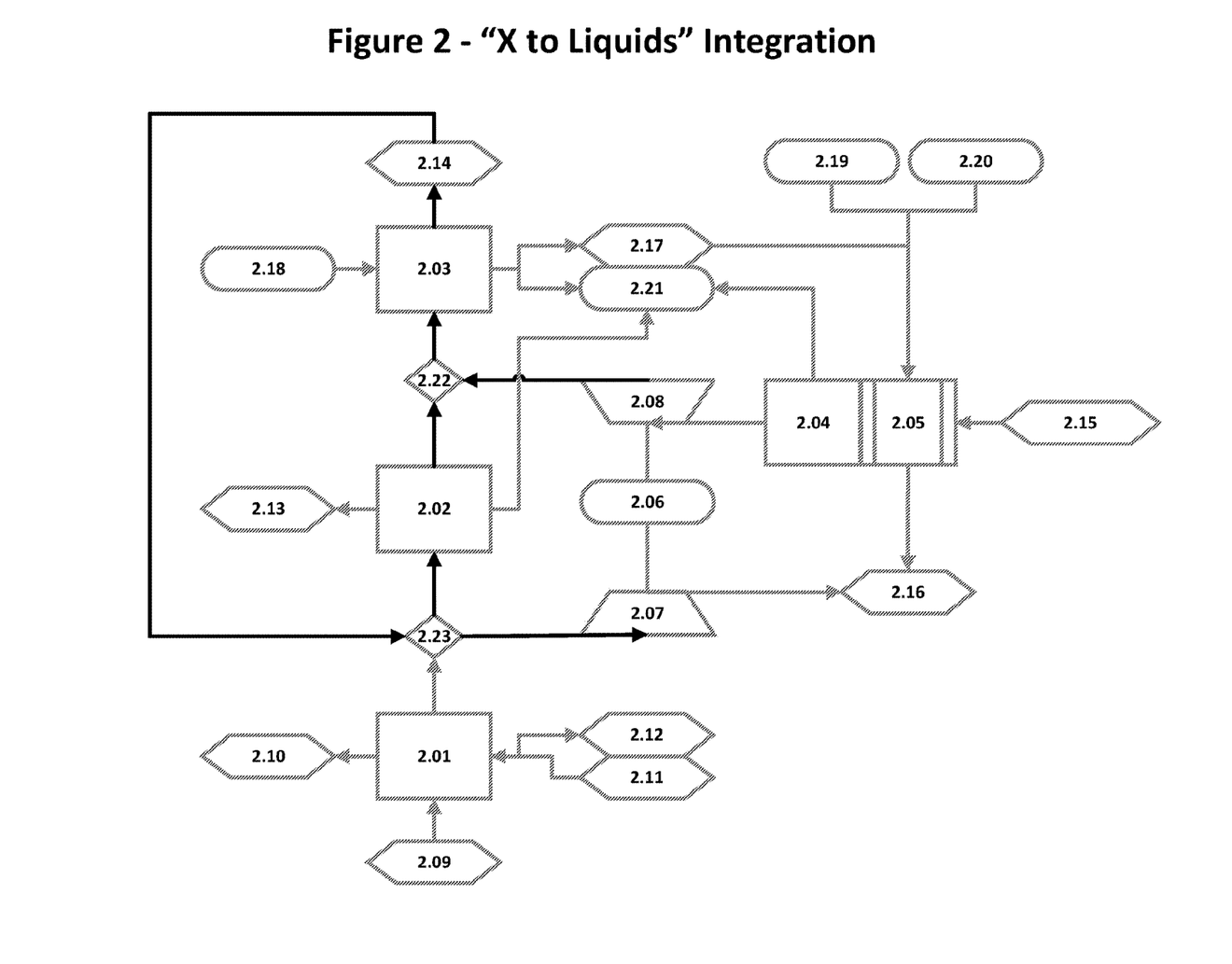
Figure 3:
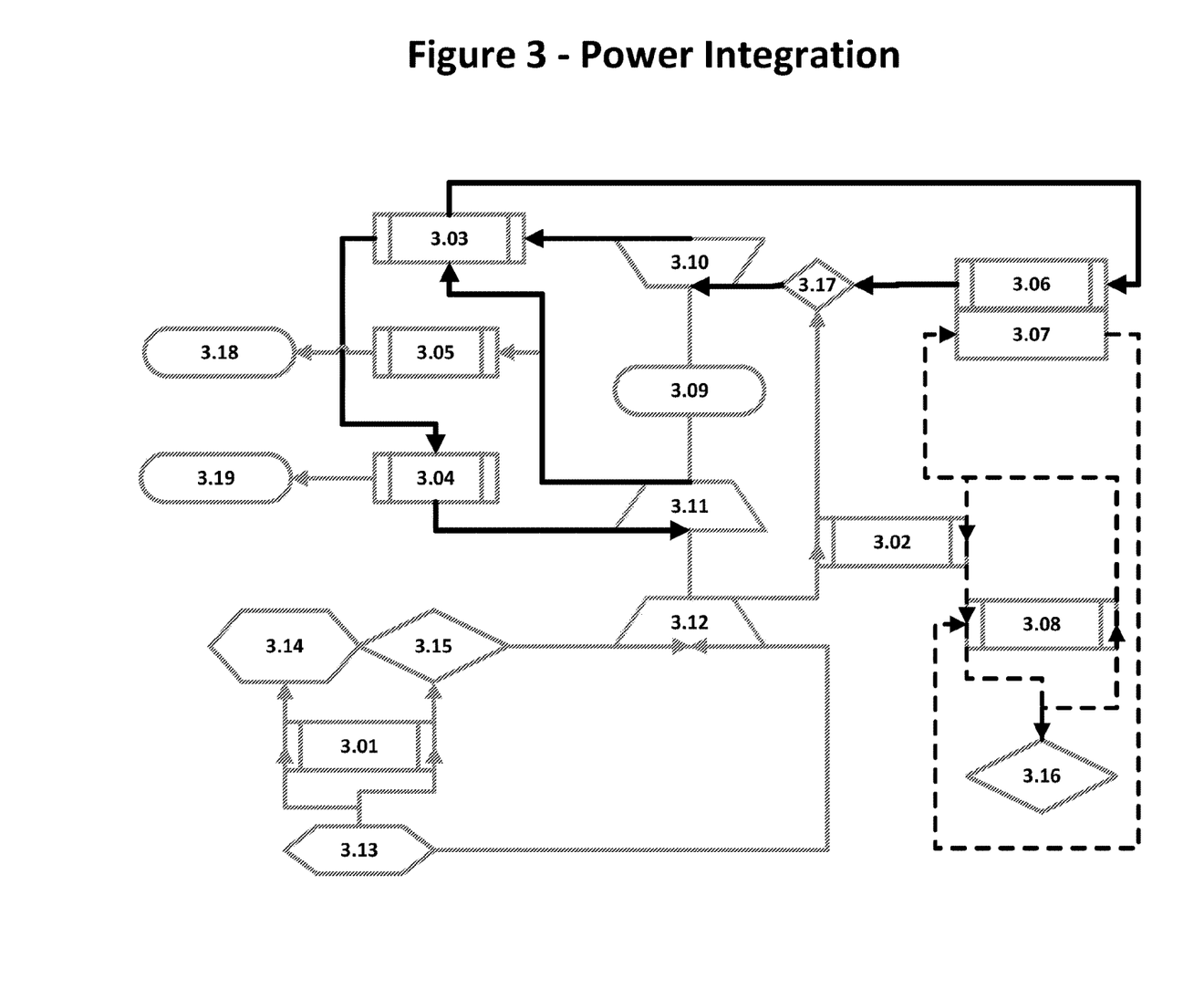

Stage 3 (S3) is the final processing step of the product synthesis gas (1.11) and operates as a reformer as well as providing deep gas cleaning. A bed of molten sodium salts (hydroxide and carbonates) (1.22) reacts with water and hydrocarbons (1.28) fed to the reactor to produce hydrogen and carbon oxides (1.18). Operation at high pressures enables cost effective integration with Fischer Tropsch units (2.04), high efficiency fuel cells (3.02), or carbon dioxide separation (3.18). The resulting hydrogen (1.18) can be utilized by various petrochemical and/or electricity production units (3.13). The operation is capable of processing solid, liquid, or gaseous forms of hydrocarbons without modification, as well as contaminated or "produced water" from the oil industry. The molten salts utilized break down feed material, wherein liberated sulfur, halogens and inorganics present are retained within the salt. Product gas composition is determined by feedstock and the energy requirements vary in direct relation. As part of the proposed integration, only gaseous feedstocks (including entrained carbon), along with water, makeup salts (1.23), and potentially salts produced by chlorination (1.10) would enter the reactor. If alkaline recycling is employed, chlorides coming from the chlorination (S2) would make up only a small fraction of the total salt, so that chlorine is not allowed to saturate the reactor (S3) and migrate to the product gas stream (1.11). Solids produced primarily through calcium salt reactions can be removed by filtering (1.33) and liquids are sent to S1.

Stage 1 (S1) is responsible for breaking down solid feed (1.27). It can be operated in various modes determined by feedstock as well as electrical input. When a high ratio of oxygen to carbon is available, through introducing water or carbon dioxide for instance, a reforming mode is realized. Reforming water and/or carbon dioxide in this way is very energy intensive however. A more efficient operating mode is obtained in an oxygen starved environment such as the plasma pyrolysis of pulverized coal and/or natural gas. In such an oxygen-deficient environment, hydrogen and carbon oxides are produced, and a stoichiometric excess of carbon may form carbon black particles, which become entrained within the gas stream (1.16). This carbon can be effectively stripped from the gas by molten salts (2.01), or simply carried by the gas to cleaning (S3). The inorganic ash formed by plasma pyrolysis (S1) becomes heated to the point of vitrification and collects in the bottom of the reactor. This ash also reacts with incoming carbon dioxide and hydrogen chloride products (1.14=1.15) from the plasma reaction (1.04) of steam and chlorinated gases (1.17) produced through chlorination (S2), causing mild residue chlorination within the pyrolysis stage (S1). Here, a careful balance of incoming alkaline content (1.27) should be maintained to limit the amount of chlorine passing through S1 and on to S3 (1.12=1.13)

Figure 4:
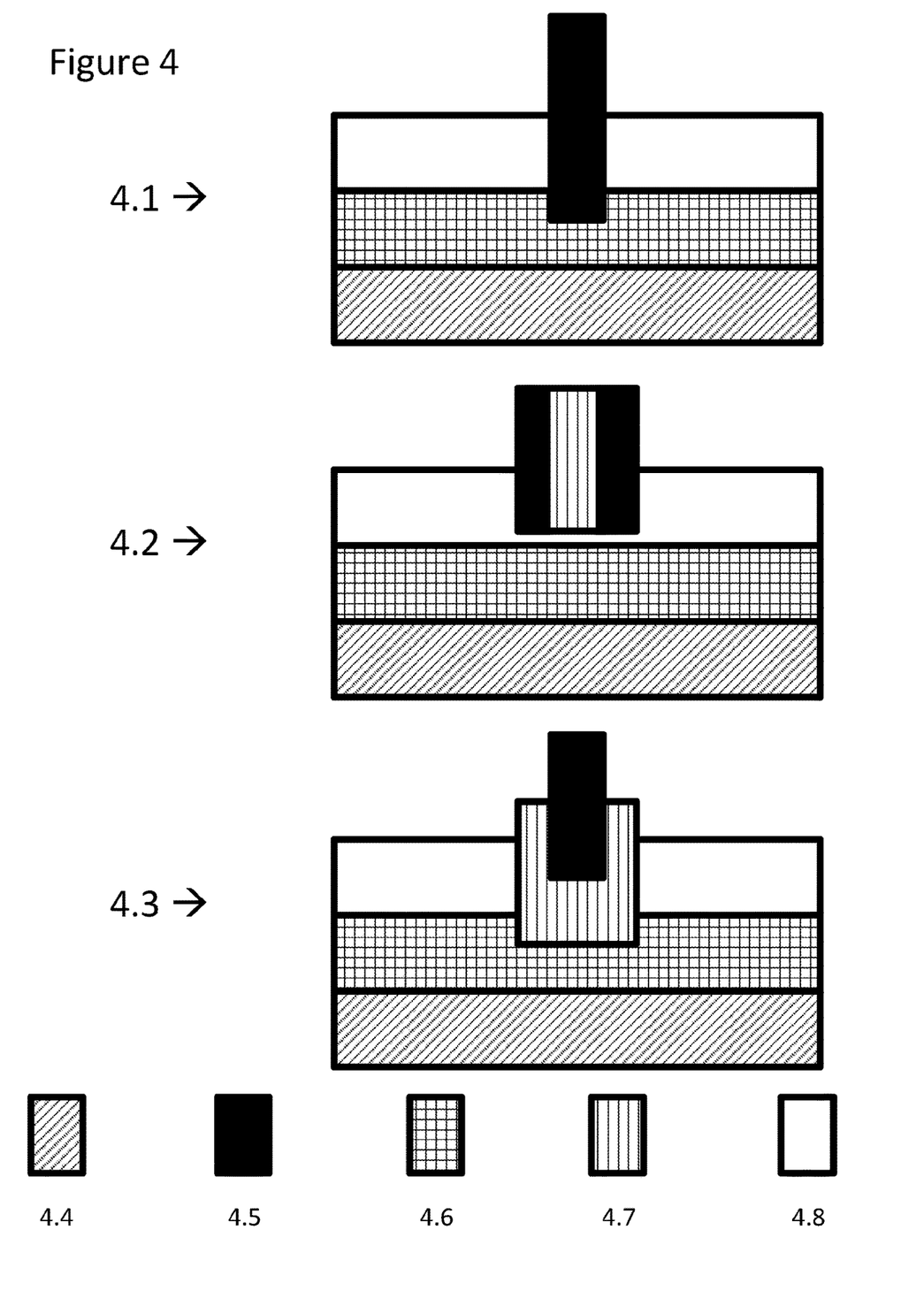

Stage 2 (S2) is where carbochlorination is elegantly slipstreamed into the staged reforming. Here, partially chlorinated residue from S1 is fully chlorinated. By full chlorination, it is meant that sufficient carbon (1.25, 1.20) and chlorine (1.19) are introduced to effectively convert all remaining compounds into chlorides. Closed, submerged electric arc furnaces are used within a biphasic molten salt system, being effectively agnostic to feed composition. This produces a byproduct non-volatile molten salt (1.10) concentrated with rare earth chlorides (1.30), which are subsequently separated (1.06). A volatile chloride gas stream (1.17) forms the primary product; this chloride gas comprising halogenated silicon, aluminum, iron, titanium, vanadium, etc. Stage 2 (S2) separates the bulk volatilized material (1.17) from non-volatile Group 1 and 2 metals, lanthanides, and actinides, as well as scandium and yttrium; all of which remain in the molten chloride melt (1.10). Taking place in a molten salt (wet) process minimizes requirements for gaseous chlorine used in more familiar (dry) chlorination processes. A consumable electrode (4.5) comprising carbon and/or mixed oxides produces an electric arc with an associated molten metal electrode (4.4) present at the base of the reactor. Lead makes for an ideal counter-electrode due to its low melting point and ability to act as a solvent for various other metals including copper, precious metals (PM), and platinum group metals (PGM). The molten metal collector (4.4), while acting as a cathode, concentrates low reactivity metals from the molten salt (4.6). Reverse polarity (anodic) reactions of the bipolar electrode (4.4) drive more reactive components to degrade the molten salt (4.6). Levels of carbon and other reactive components are especially important regarding anodic activity of the bipolar electrode (4.4). For various reasons, an AC or any alternative waveform arc may be employed. Volatilization of elements within a specified electronegativity range are determined through voltage and/or oxidizer (chlorine) availability. For simplicity, it should be assumed that an abundance of carbon present forms a baseline reductive environment. Electrochemical processing thus provides activation energy for the carbochlorination, carbon carries oxygen away, and silicon and other elements form volatile chlorides (1.17) transported with the carbon dioxide. The molten metal (4.4) and molten salt (4.6) form immiscible phases within the reactor, which can then be independently tapped as valuable concentrates (1.09, 1.10). This results in raised reaction kinetics, enabled via electrochemical activation and mixing.

FIG. 1 also utilizes a plasma electro-burner (1.04) for reacting steam (1.26) with the produced gaseous chlorides (1.17). In typical titanium production, the volatile gases are separated by condensing them to their liquid states. The same could be practiced in this processing as well, however, it would add to the overall capital cost and footprint of the equipment. An electro-burner (1.04) is presented in the example as a direct route to removing (1.05) unwanted elements (1.32) from the variable composition gas stream (1.17) in a highly controllable manner. If desired, magnetic separation of iron oxide produced in the reaction could also be utilized due to the very fine particle sizes. Processing conditions should be matched to the intended feedstocks as well as economic constraints. In most situations, a difficult to produce high purity fumed silica has little to no advantage over a much simpler mixed oxide nano-powder (1.32) for use in high performance construction materials.

Lead bullion (1.09), forming the electrode (4.4) of the staged processing (S1, S2, S3) can be directly utilized in a typical non-ferrous refinery (1.08). Alternatively, various methods could be integrated onsite to recover and refine the most valuable of the metals (1.31). Returning the lead to the core stages in a molten, non-molten, oxidized (PbO, PbCl2, PbS, etc.) or metallic state can provide numerous processing efficiencies. Once again, there are situational trade-offs to be determined. Lead processing and recycle through simple integration may make sense depending on scale.

The molten chloride salt concentrate (1.10) produced by S2 has a wide variety of options available for recovering rare earth elements (REE) as well as some of the more valuable alkali and alkaline earth metals. Chemical vapor transport (CVT) of the REEs is a well-studied phenomenon and an environmentally-friendly alternative to typical methods of REE extraction. In CVT, rare earth chlorides are complexed with aluminum chloride vapors and transported as a gas (1.06). They then deposit as solids (1.30) at a lower temperature, or could alternatively be stripped by ionic liquids. Besides CVT, the molten salt also lends itself to high temperature electrolytic processing (1.07) for removing metals such as magnesium (1.29). The byproduct of the molten salt electrolysis is chlorine gas (1.19), which may be recycled to the chlorination process, lowering demand for make-up chlorine (1.24). Processing the salt concentrate is not limited to pyrometallurgy; a vast range of hydrometallurgical methods are known and practiced on a large scale such as chlor-alkali, ammonia-soda, and other variant processes. Whatever methods are utilized, post-processing, some portion of the salts (1.22) may also be returned to S3, reducing the need for make-up salts (1.23). For small installations, the produced REE-laden molten salt may simply be sold to an off-site refiner.

With reference to FIG. 2, an advanced hybrid "X to Liquids" liquefaction operation is illustrated, capable of extracting useful hydrocarbons from literally any carbon-based feedstock (2.02), including low-grade fuels, biomass, and waste. The hybrid liquefaction combines indirect synthesis-gas based Fischer-Tropsch processing (2.04) with direct liquefaction (2.02) to produce a raw syncrude (2.22) that may undergo fractional distillation (2.03) or be sent to a refinery as high-grade crude oil (2.21).

Syngas from S3 (1.11=3.13) is processed via electrodialysis (3.01) to an ideal H2:CO ratio (3.14) and is routed (3.14=2.15) to the F-T reactor (2.04). The F-T reactor heat exchanger (2.05) transfers heat from the incoming gas stream as well as heat produced by the exothermic hydrocarbon synthesis (2.04), producing high-grade steam for S2 (2.16=1.12). Compressed or liquefied natural gas (2.20) as well as carbon dioxide (2.19) can be injected along with cooling water (2.17). The combined gases move heat from F-T (2.04) to S3, as well as creating an ideal stoichiometric composition for reforming (S3). Volatile hydrocarbons produced through F-T are expanded (2.08), combined with incoming gases (2.22) from feedstock volatilization (2.02), and condensed (2.03) to syncrude (2.21) or various hydrocarbon fractions. Non-condensed gases (2.14) are then combined with a portion of cleaned syngas (2.23) from S1 (2.09=1.13), compressed (2.07), merged with steam and other light gases from FT-HX (2.05), and routed to S3 (2.16=1.12). That concludes the indirect processing portion of hydrocarbon synthesis.

Simultaneous to the F-T processing (2.04), direct liquefaction (2.01) of incoming solid feedstock is driven by the low-pressure S1 off-gas (2.09=1.13). Light gases from S1 containing entrained carbon particles (2.09) are stripped of carbon (2.01) by contact with molten salts (2.11) from S3. The carbon-laden salt can then be routed to either S1 or S2, to meet carbon requirements (2.10), or returned (2.12) to S3. A portion of the cleaned syngas (2.23) is pressurized (2.07) and sent to S3 (2.16=1.12), while the remainder is used to liquefy and/or pyrolyze solid feedstock (2.02). The solid residue and/or spent catalyst (2.13) then goes to S1. Volatilized hydrocarbons (2.22) are distilled (2.03) and the non-condensed gases (2.14) proceed to S3.

The combination of direct and indirect liquefaction utilizes benefits of each technology, enabling more efficient conversion than either is capable of alone, while sharing common equipment capital and operational expenses. This hybrid approach enables carbon-neutral fuels, virtually limitless energy storage, and carbon dioxide recycling.

With reference to FIG. 3, a variety of power cycle options are available for converting the produced synthesis gas (1.11=3.13) into electricity; internal combustion, steam boiler, gas turbine, and fuel cells represent a few compatible technologies. Illustrated are several unique options for carbon dioxide reduction the present invention enables, which are advantageous when compared with typical power cycles.

Synthesis gas coming from S3 (1.11=3.13) is thoroughly cleaned of any compounds that might foul electrochemical cells, which the illustration advantageously utilizes. First, the gas stream is split and directed through the anode and cathode of a molten carbonate electrodialysis stack (3.01). This transfers oxygen from the cathode stream (3.14) and concentrates it in the anode stream (3.15). The oxygen-deficient (hydrogen-enriched) stream (3.14) is utilized in liquid hydrocarbon processing (3.14=2.15). Oxygen deficiency, in this case, meaning a higher (H2+CO)/(H2O+CO2) ratio than the oxygen rich stream. The oxygen-rich stream (3.15) feeds to a modified Allam-type thermodynamic cycle. The Allam power cycle is a good starting point for integrating electricity production for various reasons. The major advantages of this cycle are high power density and integrated carbon capture using supercritical CO2 for the working fluid.

A "typical" Allam cycle operates roughly as follows:
1) high-temperature, supercritical CO2 is expanded through a turbine (producing mechanical work that drives a generator, producing electricity)
2) sc-CO2 is cooled and water is condensed out
3) sc-CO2 is compressed to high pressure and an amount equivalent to that produced by the burned fuel is separated
4) fuel is added to the gas stream, combusted, and the cycle repeats The variation outlined in this disclosure uses a hybrid Allam cycle. The hybrid cycle eliminates requirements for cryogenic air separation, removing direct combustion entirely, while retaining the advantages of integrated carbon capture and a relatively simple cycle. A high-temperature fuel cell (3.02) operating from 500-900 C is utilized as the topping cycle. The cell stack (3.02) runs incoming synthesis gas (3.13, 3.15) through the anode side and heated air through the cathode. This prevents dilution of the CO2 working fluid (3.17) by atmospheric nitrogen and an economizer (3.08) transfers heat from the exhaust stream to the incoming air (3.16). The exhausted (oxidized) fuel is mixed with the bulk working fluid (3.17) and run through the typical Allam-cycle steps: expanded (3.10), cooled (3.03), water condensed (3.04), re-compressed (3.11), excess carbon dioxide removed (3.05), and reheated (3.03). In place of direct combustion, a second heat exchanger (3.06) is also utilized in reheating the working fluid. This secondary heat exchanger (3.06) draws from S3 and there is no mixing of the power-cycles' working fluid with reactants from that process. A chemical looping reaction (3.07) is shown to accommodate the added heat-load, molten metals (4.4) react with oxygen from air (3.16), then get reduced in S3 (reacting exothermically with carbon) and the process is repeated. In the diagram, the air intake/exhaust for the high-temperature fuel cell (3.02) and the molten-metal-oxide chemical-looping (3.07) utilize a common economizer (3.08).

The described power cycle integration allows for high-efficiency, integrated CO2 capture (3.18), water conservation (3.19), and electricity generation (3.09).

FIG. 4 illustrates a simplified cross-sectional view of several possible embodiments of an electrochemically assisted molten salt carbochlorination apparatus. These drawings will look familiar to those of ordinary skill in the art of electric arc furnace operation with a few notable exceptions. Common electric arc furnaces have a molten iron charge, which is lead in this case. Hence, the reactor can be operated at much lower temperatures than typical electric arc furnaces due to lead's much lower melting point. Likewise, rather than a layer of slag, a layer of fused salt is utilized. Furthermore, operating with a fused salt requires a different set of design criteria regarding corrosion, redox, electrochemical operations, etc. than would be typical in electric arc furnace operation.

4.1 depicts a simple implementation wherein the solid carbon electrode is in direct contact with the molten salt, the salt being ionically conductive and possibly having a wide range of electrical conductivity, depending on composition. This implementation may forgo arcing and rather act as an electrolytic cell or resistive heater. If the electrode is raised, it may arc to the fused salt (depending on conductivity and/or voltage). Feedstock would enter directly into the headspace.

4.2 depicts a hollow solid carbon electrode wherein feedstock is injected directly into and forced to pass through the plasma created via electric arcing. Depending on the composition of the fused salt, it may be desirable to have the electrode raised out of the molten salt or submerged within it. The conductivity of the salt and operating voltage will determine any plasma forming phenomena.

4.3 depicts a solid carbon electrode located coaxially within a non-conducting electrode sheath, thus forming an annulus for the injection of reactants. In this embodiment, the feedstock is forced not only through the electric arc plasma but must also pass through the molten salt before off-gas escapes to the headspace. In this configuration, the arc's ability to operate in a submerged mode is decoupled from the electrical conductivity of the fused salt. This results from the non-conducting sheath, being submerged, encasing the electrode and preventing electrode contact with the salt.

Figure 5:
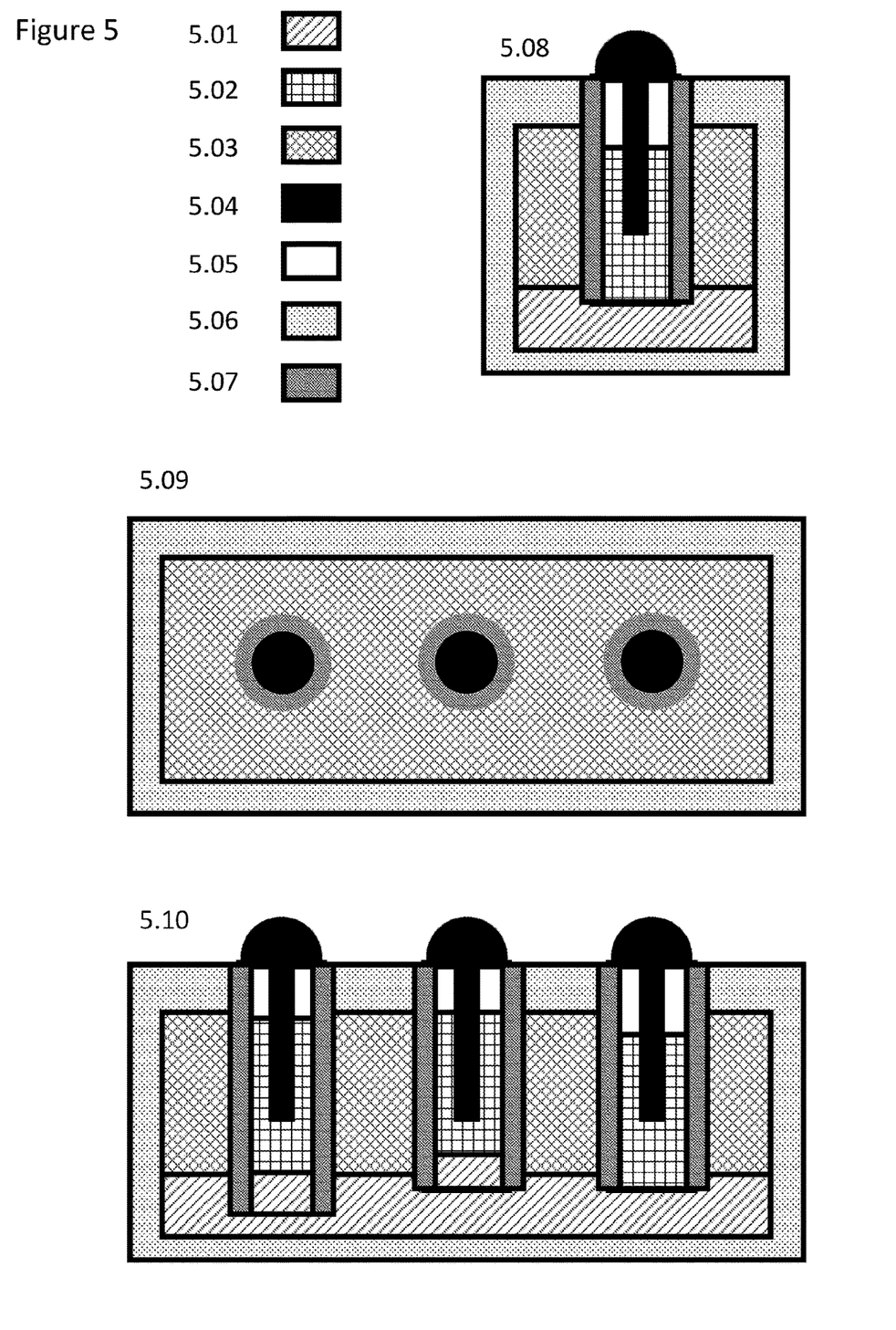

The three examples depicted are in no way a limiting set of possible electrode configurations. They are presented as several options available for utilization within the electrode assemblies (5.04) of the instant invention.

With reference to FIG. 5, a specific embodiment of the electrochemical apparatus central to the instant invention is illustrated. This drawing is an extension of FIG. 4 such that the electrode arrangements depicted therein are used by individual reactors within a more complex electrochemical device depicted herein. For simplicity, assume the electrode arrangement of FIG. 4.3 is utilized, along with a hollow carbon electrode and various other feeder, gas handling, electrode handling, power and control systems, forming a single assembly, herein referred to as "electrode assembly" (5.04). Furthermore, the device comprises multiple electrochemical reactors (cells), each comprising a unique electrode assembly, internal containment structure, headspace, and molten salt component. The multiple electrochemical reactors comprising the device share common components such as the molten-metal electrode, a secondary salt or containment salt, external enclosure, power supply, etc.

Illustration 5.10 depicts components used in the electrochemical operation of the device. For simplicity, the electrode assembly (5.04), wherever referenced, further comprises power supply, feed handling, and control systems. The outer containment (5.06) can be of any shape and size. Here, that containment is presented as a rectangular box meant to resemble a multimodal shipping container. The outer containment has less stringent corrosion concerns than the internal containment (5.07), with the outer (5.6) being in contact with a lower temperature (roughly 600+/−100 C) hydroxide and carbonate salt, as well as molten lead. As such, it can be made of simple steel (possibly a high-nickel alloy with anti-corrosion coating). If the device were operated within something like a multimodal container, it would be prudent to have a thermal and electrically insulating material between the outer containment wall and the multimodal container. The outer containment (5.06), containment salt (5.03), and molten metal (5.01) together represent S3 of the instant invention. Although it is feasible to integrate S3 directly with the device as shown, it would likely be beneficial for thermal storage, modularity, scaling, and various other reasons to move the actual reactions of S3 to a large specialized pressure vessel and circulate the molten metal and/or salt between the outer containment (5.06) and said specialized pressure vessel. At the top of the containment (5.06), where the external containment meets the internal reactor walls (5.07), a hermetic seal is assumed for gas handling. Thus, the entire control apparatus can be removed or replaced for individual internal reactors via the electrode assemblies (5.04).

Each internal electrochemical reactor (cell) is separated from the containment environment via a wall of suitable refractory material (5.07). FIG. 5 shows these as cylinders, but they may be of any appropriate shape. Depending on the desired electrochemical functionality, the refractory material may be non-conducting such as quartz or SiAlON (silicon-aluminum-oxynitride) or conducting such as graphite. The internal separator (5.07), being in intimate proximity with corrosive materials and reactions of the internal reactors, is intended to be a serviceable part like the electrode assembly. By controlling the temperature and composition of the molten salts, a solid passivation layer (skull) may be formed to limit corrosion of the internal separator.

Through an arrangement of gas handling and real-time monitoring of the processing, these cells form S1 and S2 of the instant invention. Three are shown in the picture (5.10), operating via 3-phase power, and having a dedicated reactor for S1 and S2 as well as an intermediate stage. Integrating more reactors enables, larger, high-throughput systems with redundancy via cascading dynamic reactive distillation. This cascade may be entirely serial (adhering to the described stages), have one or more cells operating in parallel, combine serial and parallel cells and dynamically adjust for the reaction's progression from S1 to S2 (level of chlorination), or incorporate other stages for specific material recovery (e.g. CVT of REE). Thus, a counter-current cascade is developed wherein gases flow from one reactor to the next, while solid/liquid material shifts from stage to stage. If designed appropriately, the overall electrochemical device could theoretically operate as a secondary cell, rectifier, or other functions beneficial to grid operations.

The electrochemical processing being undertaken should be understood as electrochemical activation of various redox reaction mechanisms of the desired carbochlorination and pyrolysis reactions. Stated another way, the device electrochemically assists carbochlorination and reforming. This means imposed voltage between the electrodes orchestrates non-spontaneous (thermodynamically unfavorable) reactions, (i.e. electro-deoxidation of silica, etc.), triggering a physicochemical cascade, enhancing the desired reaction kinetics. Basic electrochemical phenomena (electrochemical activation) common to many processes such as electro-extraction and electro-refining drive the process. In this case, the desired products are primarily gaseous, meaning rather than depositing material, products are removed through chemical vapor transport according to Le Chatelier's principle. The electrochemical processing thus fluxes the reactor, producing a range of activated complexes too broad to feasibly consider. The net result is electro-catalysis-like behavior, except in this case the electrodes actively take part in the reactions, degrading and converting the electrolyte. Hence, renewal and replacement of the electrode components are addressed in the design of the present invention. The device depicted in 5.10 shows three of the cells (electrochemical reactors) with each having various salt levels. Each cell may have a different level of salt, and may furthermore be operated at varying pressures. Many more operating conditions may be altered, with the unifying feature being their shared components, both within the enclosure and without (i.e. control and power supply systems).

The progression of the cells from S1 to S2 then is an arbitrary division of stages based on the overall chlorination of the charge (molten salt, dissolved and unreacted feed). S1 is assumed to "start" with a salt similar in composition to S3. As feed enters, it undergoes flash pyrolysis, if not already pyrolytic. As chlorine containing compounds enter, the salt becomes progressively chlorinated. As oxides enter, they will accumulate if a suitable carbochlorination rate is lacking, eventually leading to an overfill or worse (freezing) of the cell. One method of addressing an overfill would be to pressurize the cell, purging some or all its salt (5.02) to the containment salt (5.03), then introducing fresh salt from S3. However, it would be preferable to avoid purging by having a suitable processing train which ramps up chlorination gradually. To avoid freezing and to adjust to the variable composition of the charge, each cell can independently vary its internal resistance (i.e. heat generation) through raising and lowering the solid electrode (5.04). Electricity converted to heat in this way benefits S3 vis-a-vis the containment salt continually drawing heat from the cells.

The actual embodiment of the invention may vary considerably from the illustrated embodiments without extending beyond the scope of this disclosure, and any limitations should be drawn exclusively through the appended claims, with any reference to an element in the singular signifying "one or more" unless specifically stated otherwise.

The invention claimed is:

1. An electrochemical device for molten salt processing of a reactant, the device comprising a biphasic system of a high density molten metal component and at least one molten salt component, the device further comprising:
   a bipolar electrode formed by the high density molten metal component maintaining electrical contact with the molten salt components of the electrochemical device;
   an external enclosure providing structural support and environmental containment of the biphasic system;
   at least one internal enclosure providing separation of the molten salt components while allowing the bipolar electrode to maintain electrical communication with the at least one molten salt component;
   at least one electrode assembly forming a variable electric circuit, the variable electric circuit further comprising components of the biphasic system;
   wherein the electrochemical device processes the reactant through a series of stages including chlorination, which separates a volatile gas comprising at least one chloride of silicon, titanium, iron or aluminum from a multiphase residue concentrated with at least one non-volatilized rare earth compound or precious metal.

2. The device of claim 1, wherein one of the internal enclosures, one of the molten salt components, and one of the electrode assemblies forms a distinct reaction vessel.

3. The device of claim 1, wherein a plurality of the internal enclosures share the high density molten metal component and the external enclosure.

4. The device of claim 1, wherein at least one of the electrode assemblies further comprises a solid carbon electrode located coaxially within a refractory sheath forming an annulus for injection of the reactant.

5. The device of claim 4, wherein the solid carbon electrode is hollow allowing for injection of a secondary reactant stream.

6. The device of claim 4, wherein the refractory sheath is submerged within one of the molten salt components forcing the reactant to interact with the molten salt component before forming the volatile gas.

7. The device of claim 4, wherein the at least one electrode assembly comprises a solid carbon electrode and a mechanical system controlling a vertical positioning of the solid carbon electrode, allowing it to be consumed within the electrochemical device at different rates as well as changing resistance of the variable electric circuit.

8. The device of claim 1, wherein at least one of the molten salt components contains compounds with cations primarily of the group consisting of alkali metals and alkaline earth metals.

9. The device of claim 1, wherein at least one of the molten salt components contains compounds with anions primarily of the group consisting of chlorides, hydroxides, and carbonates.

10. The device of claim 1, wherein at least one of the internal enclosures can purge the reactant by increasing pressure of the at least one internal enclosure relative to that of the external enclosure, forcing the reactant to displace the bipolar electrode and migrate to the external enclosure.

11. The device of claim 1, wherein the external enclosure further comprises tapping mechanisms for individually removing the high density molten metal component and the at least one molten salt component.

12. The device of claim 1, wherein the at least one internal enclosure accumulates a solid or glassy residue, controlled via altering composition or temperature of the at least one molten salt component.

13. The device of claim 1, wherein the external enclosure comprises a steel, rectangular, box-like structure, with anti-corrosion coating of its internal surfaces; refractory and insulating materials surrounding its exterior; and containing a molten hydroxide salt.

14. The device of claim 1, wherein the one of the at least one internal enclosure comprises a circular wall of refractory material extending top down through the external enclosure, forming a hermetic vessel between the high density molten metal component and the electrode assembly as a lid.

15. The device of claim 1, wherein the at least one internal enclosure progresses through a series of processing stages including a hydroxide salt processing of pyrolytic residues, and proceeding through progressive stages of carbochlorination.

16. The device of claim 1, wherein the external enclosure operates at about 500-700 degrees Celsius and draws heat from the at least one internal enclosure, which operates at a temperature gradient exceeding 500 degrees Celsius.

17. The device of claim 1, wherein the bipolar electrode comprises a lead alloy acting to transport carbon and reactive metals between the at least one internal enclosure and the external enclosure, the bipolar electrode retaining less reactive elements.

18. The device of claim 1, wherein the electrochemical reactor is maintained in a carbon saturated state through introducing a carbon reactant into the at least one internal enclosure.

19. The device of claim 1 comprising at least two internal enclosures, wherein the volatile gas is produced within the first of the internal enclosures and is routed to a second of the internal enclosures, forming a dynamic series of cascading reactive distillation.

20. The device of claim 19 further comprising multiple external enclosures interconnected via the dynamic series of cascading reactive distillation.

21. The device of claim 1, further comprising:
an intermodal container packaging the external enclosure and three of the internal enclosures as a three-phase modular reactor;
dynamic flow control for routing gases between modular reactors;
electrical equipment for monitoring molten salt composition and reactor integrity;
real-time gas stream monitoring; and
machine learning optimization of operating parameters.

* * * * *